(12) United States Patent
Nahum

(10) Patent No.: US 10,751,883 B2
(45) Date of Patent: Aug. 25, 2020

(54) ROBOT SYSTEM WITH SUPPLEMENTARY METROLOGY POSITION COORDINATES DETERMINATION SYSTEM

(71) Applicant: Mitutoyo Corporation, Kanagawa-ken (JP)

(72) Inventor: Michael Nahum, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 211 days.

(21) Appl. No.: 16/104,033

(22) Filed: Aug. 16, 2018

(65) Prior Publication Data

US 2020/0055191 A1 Feb. 20, 2020

(51) Int. Cl.
*B25J 9/16* (2006.01)
*B25J 17/02* (2006.01)

(52) U.S. Cl.
CPC ........... *B25J 9/1697* (2013.01); *B25J 9/1664* (2013.01); *B25J 17/0258* (2013.01)

(58) Field of Classification Search
CPC .... B25J 9/1697; B25J 17/0258; B25J 9/1664; G05B 2219/39045; G05B 2219/37098; G05B 2219/39008
USPC ................................................. 700/245, 259
See application file for complete search history.

(56) References Cited

U.S. PATENT DOCUMENTS

| | | | |
|---|---|---|---|
| 4,613,943 A * | 9/1986 | Miyake | B23K 9/12 318/568.2 |
| 4,725,965 A | 2/1988 | Keenan | |
| 5,105,368 A | 4/1992 | Alexandersen et al. | |
| 5,297,238 A * | 3/1994 | Wang | B25J 9/1692 700/254 |
| 5,617,335 A | 4/1997 | Hashima et al. | |
| 5,798,947 A | 8/1998 | Ye et al. | |
| 5,876,325 A * | 3/1999 | Mizuno | A61B 34/37 600/102 |
| 6,222,940 B1 | 4/2001 | Wenzel et al. | |
| 6,640,008 B1 | 10/2003 | Lee et al. | |

(Continued)

OTHER PUBLICATIONS

Krajník et al., "External Localization System for Mobile Robotics," *16th International Conference on Advanced Robotics (ICAR)*, Nov. 25-29, 2013, Montevideo, Uruguay. (6 Pages).

(Continued)

*Primary Examiner* — Jaime Figueroa
(74) *Attorney, Agent, or Firm* — Seed IP Law Group LLP

(57) ABSTRACT

A supplementary metrology position coordinates determination system is provided for use with an articulated robot. A first accuracy level defined as a robot accuracy (e.g., for controlling and sensing an end tool position of an end tool that is coupled to a robot arm portion that moves in an XY plane), is based on using position sensors (e.g., rotary encoders) included in the robot. The supplementary system includes an imaging configuration, XY scale, image triggering portion and processing portion. One of the XY scale or imaging configuration is coupled to the robot arm portion and the other is coupled to a stationary element (e.g., a frame located above the robot). The imaging configuration acquires an image of the XY scale, which is utilized to determine a relative position that is indicative of the end tool position, with an accuracy level that is better than the robot accuracy.

23 Claims, 8 Drawing Sheets

(56) References Cited

U.S. PATENT DOCUMENTS

| | | | |
|---|---|---|---|
| 6,681,151 B1 | 1/2004 | Weinzimmer et al. | |
| 6,781,694 B2 | 8/2004 | Nahum et al. | |
| 6,937,349 B2 | 8/2005 | Jones et al. | |
| 7,105,753 B1 | 9/2006 | Lapstun et al. | |
| 7,532,949 B2* | 5/2009 | Ban | B25J 19/023 |
| | | | 345/419 |
| 7,845,560 B2 | 12/2010 | Emanuel et al. | |
| 8,792,963 B2 | 7/2014 | Zhao et al. | |
| 8,981,324 B2* | 3/2015 | Rigney | G05B 15/02 |
| | | | 250/492.3 |
| 9,050,728 B2* | 6/2015 | Ban | B25J 9/1697 |
| 9,572,549 B2* | 2/2017 | Belevich | A61B 8/587 |
| 10,058,996 B2* | 8/2018 | Hosek | B25J 9/1638 |
| 10,099,380 B2* | 10/2018 | Ishige | B25J 9/1697 |
| 10,625,427 B2* | 4/2020 | Troy | B25J 11/00 |
| 2003/0144765 A1* | 7/2003 | Habibi | B25J 9/1697 |
| | | | 700/259 |
| 2005/0225278 A1* | 10/2005 | Ban | B25J 9/1692 |
| | | | 318/568.11 |
| 2006/0017022 A1* | 1/2006 | Rigney | A61N 5/1067 |
| | | | 250/497.1 |
| 2009/0180667 A1 | 7/2009 | Mahan et al. | |
| 2009/0234502 A1* | 9/2009 | Ueyama | G05B 19/401 |
| | | | 700/259 |
| 2010/0331855 A1* | 12/2010 | Zhao | A61B 34/30 |
| | | | 606/130 |
| 2011/0029131 A1* | 2/2011 | Ban | B25J 9/1692 |
| | | | 700/254 |
| 2013/0035791 A1* | 2/2013 | Chiu | B25J 9/1692 |
| | | | 700/253 |
| 2013/0090554 A1* | 4/2013 | Zvuloni | A61B 10/0241 |
| | | | 600/424 |
| 2013/0123982 A1* | 5/2013 | Chiu | B25J 9/1692 |
| | | | 700/254 |
| 2014/0301632 A1* | 10/2014 | Ikeda | B25J 9/1697 |
| | | | 382/152 |
| 2015/0158181 A1* | 6/2015 | Kawamura | B25J 9/1697 |
| | | | 700/259 |
| 2016/0008988 A1* | 1/2016 | Kennedy | B25J 9/06 |
| | | | 414/738 |
| 2016/0039096 A1 | 2/2016 | Wallack et al. | |
| 2016/0136812 A1* | 5/2016 | Hosek | B25J 9/104 |
| | | | 700/254 |
| 2016/0151915 A1* | 6/2016 | Nishi | B25J 9/1692 |
| | | | 700/247 |
| 2017/0148154 A1* | 5/2017 | Nakao | G06T 7/74 |
| 2017/0151671 A1* | 6/2017 | Ishige | G06K 9/00355 |
| 2017/0182665 A1* | 6/2017 | Okuyama | B25J 9/1697 |
| 2018/0004188 A1* | 1/2018 | Yamaguchi | B25J 13/02 |
| 2018/0279993 A1* | 10/2018 | Crawford | A61B 90/50 |
| 2018/0361571 A1* | 12/2018 | Georgeson | B25J 9/1692 |
| 2018/0361595 A1* | 12/2018 | Troy | B25J 9/162 |
| 2019/0015980 A1* | 1/2019 | Kojima | B25J 9/1666 |
| 2019/0256300 A1* | 8/2019 | Shimamura | B25J 9/1692 |

OTHER PUBLICATIONS

Pérez et al., "Robot Guidance Using Machine Vision Techniques in Industrial Environments: A Comparative Review," *Sensors* 16(3):335, 2016. (26 pages).

SCARA, URL=https://en.wikipedia.org/w/index.php?title=SCARA &oldid=838861482, Archive Date Apr. 29, 2018. (2 pages).

* cited by examiner

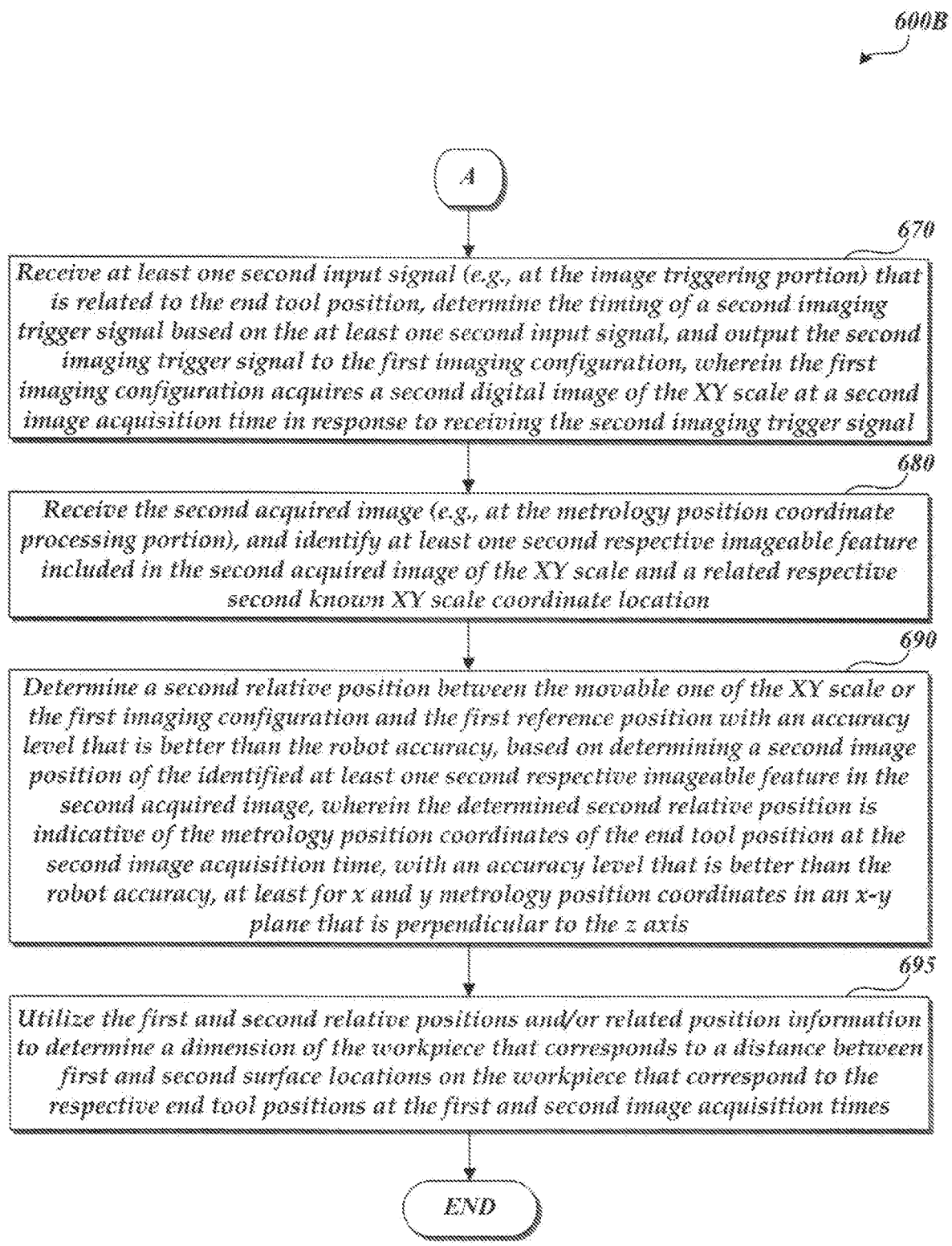

ROBOT SYSTEM WITH SUPPLEMENTARY METROLOGY POSITION COORDINATES DETERMINATION SYSTEM

BACKGROUND

Technical Field

This disclosure relates to robot systems and, more particularly, to systems for determining coordinates of an end tool position of an articulated robot.

Description of the Related Art

Robotic systems are increasingly utilized for manufacturing and other processes. One type of articulated robot system that is commonly used includes a selective compliance articulated robot arm (SCARA). Such SCARA systems typically may have a base, with a first arm portion rotationally coupled to the base, and a second arm portion rotationally coupled to an end of the first arm portion. In various configurations, an end tool may be coupled to an end of the second arm portion (e.g., for performing certain work and/or inspection operations). Such systems may include position sensors (e.g., rotary encoders) utilized for determining/controlling the positioning of the arm portions and correspondingly the positioning of the end tool. In various implementations, such systems may have a positioning accuracy of approximately 100 microns, as limited by certain factors (e.g., the rotary encoder performance in combination with the mechanical stability of the robot system, etc.)

U.S. Pat. No. 4,725,965 (the "'965 patent"), which is hereby incorporated herein by reference in its entirety, discloses certain calibration techniques for improving the accuracy of a SCARA system. As described in the '965 patent, a technique is provided for calibrating a SCARA type robot comprising a first rotatable arm portion and a second rotatable arm portion which carries an end tool. The calibration technique is in relation to the fact that the SCARA robot may be controlled using a kinematic model, which, when accurate, allows the arm portions to be placed in both a first and second angular configuration at which the end tool carried by the second arm portion remains at the same position. To calibrate the kinematic model, the arm portions are placed in a first configuration to locate the end tool above a fixed datum point. Then, the arm portions are placed in a second angular configuration to nominally locate the end tool again in registration with the datum point. The error in the kinematic model is computed from the shift in the position of the end tool from the datum point when the arm portions are switched from the first to the second angular configuration. The kinematic model is then compensated in accordance with the computed error. The steps are repeated until the error reaches zero, at which time the kinematic model of the SCARA robot is considered to be calibrated.

As further described in the '965 patent, the calibration technique may include the use of certain cameras. For example, in one implementation, the datum point may be the center of the viewing area of a stationary television camera (i.e., located on the ground below the end tool), and the output signal of the camera may be processed to determine the shift in the position of the end tool from the center of the viewing area of the camera when the links are switched from the first to the second configuration. In another implementation, the second arm portion may carry a camera, and the technique may begin by placing the arm portions in a first angular configuration, at which a second predetermined interior angle is measured between the arm portions, to center the camera carried by the second arm portion directly above a fixed datum point. The arm portions are then placed in a second angular configuration, at which an interior angle, equal to the second predetermined interior angle, is measured between the arm portions, to nominally center the camera again above the datum point. The output signal of the camera is then processed to determine the shift in the position of the datum point, as seen by the camera, upon switching the arm portions from the first to the second angular configuration. The error in the known position of the camera is then determined in accordance with the shift in the position of the datum point as seen by the camera. The steps are then repeated as part of the calibration process until the error approaches zero.

While techniques such as those described in the '965 patent may be utilized for calibrating a SCARA robot system, in certain applications it may be less desirable to utilize such techniques (e.g., which may require significant time and/or may not provide a desired level of accuracy for all possible orientations of the SCARA robot during certain operations, etc.) A robot system that can provide improvements with regard to such issues (e.g., for increasing the reliability, repeatability, speed, etc., of the position determination during workpiece measurements and other processes) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A robot system is provided including an articulated robot (e.g., a SCARA robot) and a supplementary metrology position coordinates system. The articulated robot includes first and second arm portions, first and second rotary joints, a motion control system, and position sensors. The first arm portion is mounted to the first rotary joint at a proximal end of the first arm portion. The first rotary joint has a rotary axis aligned along a z axis direction such that the first arm portion moves about the first rotary joint in an x-y plane that is perpendicular to the z axis. The second rotary joint is located at a distal end of the first arm portion. The second rotary joint has its rotary axis nominally aligned along the z axis direction. The second arm portion is mounted to the second rotary joint at a proximal end of the second arm portion. The second arm portion moves about the second rotary joint in an x-y plane that is nominally perpendicular to the z axis. The motion control system is configured to control an end tool position of an end tool (e.g., a touch probe, a scanning probe, a camera, etc., as part of an end tool configuration that is coupled proximate to a distal end of the second arm portion). The end tool position is controlled with a level of accuracy defined as a robot accuracy, based at least in part on sensing and controlling the angular positions of the first and second arm portions about the first and second rotary joints, respectively, using the position sensors (e.g., rotary encoders) included in the articulated robot.

The supplementary metrology position coordinates determination system includes a first imaging configuration, an XY scale, an image triggering portion, and a metrology position coordinate processing portion. The first imaging configuration includes a first camera and has an optical axis that is nominally aligned parallel to the z axis and has a range of focus along the optical axis. The XY scale includes a nominally planar substrate arranged nominally perpendicular to the z axis and a plurality of respective imageable features distributed on the substrate. The respective imageable features are located at respective known XY scale coordinates on the XY scale. The image triggering portion is configured to input at least one input signal that is related to the end tool position and determine the timing of a first imaging trigger signal based on the at least one input signal and output the first imaging trigger signal to the first imaging configuration. The first imaging configuration is configured to acquire a digital image of the XY scale at an image acquisition time in response to receiving the first imaging trigger signal. The metrology position coordinate processing portion is configured to input the acquired image and identify at least one respective imageable feature included in the acquired image of the XY scale and the related respective known XY scale coordinate location. In various implementations, the XY scale may be an incremental or absolute scale.

The supplementary metrology position coordinates determination system is configured with a movable one of the XY scale or the first imaging configuration coupled to the second arm portion proximate to the distal end of the second arm portion and the other coupled to a stationary element with the location of the XY scale along the z axis within the range of focus of the first imaging configuration. The stationary one of the XY scale or the first imaging configuration defines a first reference position. The supplementary metrology position coordinates determination system is further configured such that the metrology position coordinate processing portion is operable to determine a relative position between the movable one of the XY scale or the first imaging configuration and the first reference position with an accuracy level that is better than the robot accuracy, based on determining an image position of the identified at least one respective imageable feature in the acquired image. The determined relative position is indicative of the metrology position coordinates of the end tool position at the image acquisition time, with an accuracy level that is better than the robot accuracy, at least for x and y metrology position coordinates in an x-y plane that is perpendicular to the z axis. In various implementations, the supplementary metrology position coordinates determination system is configured to determine the metrology position coordinates of the end tool position at the image acquisition time, based on the determined relative position and a known coordinate position offset between the end tool position and the movable one of the XY scale or the first imaging configuration.

In various implementations, the XY scale may be coupled to the second arm portion proximate to the distal end of the second arm portion. The first imaging configuration may be coupled to the stationary element. In various implementations, the stationary element may comprise a frame arranged above at least a portion of an operable work volume of the articulated robot. The first imaging configuration may be fixed to the frame above a portion of an operable work volume of the articulated robot.

In various implementations, the robot system may be operated in either a robot position coordinates mode or a supplementary metrology position coordinates mode. The robot position coordinates mode may correspond to an independent and/or standard mode of operation for the articulated robot (e.g., a mode in which the articulated robot is operated independently, such as when a supplementary metrology position coordinates determination system is not active or is otherwise not provided). In the robot position coordinates mode, the articulated robot movements and corresponding end tool position are controlled and determined with the level of accuracy defined as the robot accuracy (i.e., utilizing the position sensors included in the articulated robot). Conversely, in the supplementary metrology position coordinates mode, a relative position may be determined by the supplementary metrology position coordinates determination system that is indicative of the metrology position coordinates of the end tool position at an image acquisition time, with an accuracy level that is better than the robot accuracy (e.g., better than the accuracy of the position sensors included in the articulated robot), at least for x and y metrology position coordinates in an x-y plane that is perpendicular to the z axis. In various implementations, the determined position information (e.g., the determined relative position, the determined metrology position coordinates of the end tool position and/or other related determined position information) may then be utilized for performing a designated function (e.g., as part of workpiece measurements, positioning control of the articulated robot, etc.)

As an example with respect to positioning control of the articulated robot, during the supplementary metrology position coordinates mode, rather than utilizing the position sensors included in the articulated robot for controlling a positioning of the end tool, an output from the supplementary metrology position coordinates determination system may be fed back to the motion control system or otherwise utilized to control the positioning of the end tool. In various implementations, a hybrid operation may be implemented, wherein the position sensors included in the articulated robot may be utilized during a first portion of a robot movement timing (e.g., for determining/controlling the positions of the arm portions and corresponding end tool position as part of initial/fast/coarse movement positioning). Then, during a second portion of the robot movement timing, rather than utilizing the position sensors of the articulated robot, an output of the supplementary metrology position coordinates determination system (e.g., the determined relative position or related position information) may be fed back to the motion control system or otherwise utilized for controlling the positioning (e.g., for determining/controlling the positions of the arm portions and the corresponding end tool position as part of a more accurate final/slower/fine movement positioning).

BRIEF DESCRIPTION OF THE SEVERAL VIEWS OF THE DRAWINGS

FIGS. 6A and 6B are flow diagrams illustrating exemplary implementations of routines for operating a robot system including an articulated robot and a supplementary metrology position coordinates determination system.

DETAILED DESCRIPTION

Figure 1:
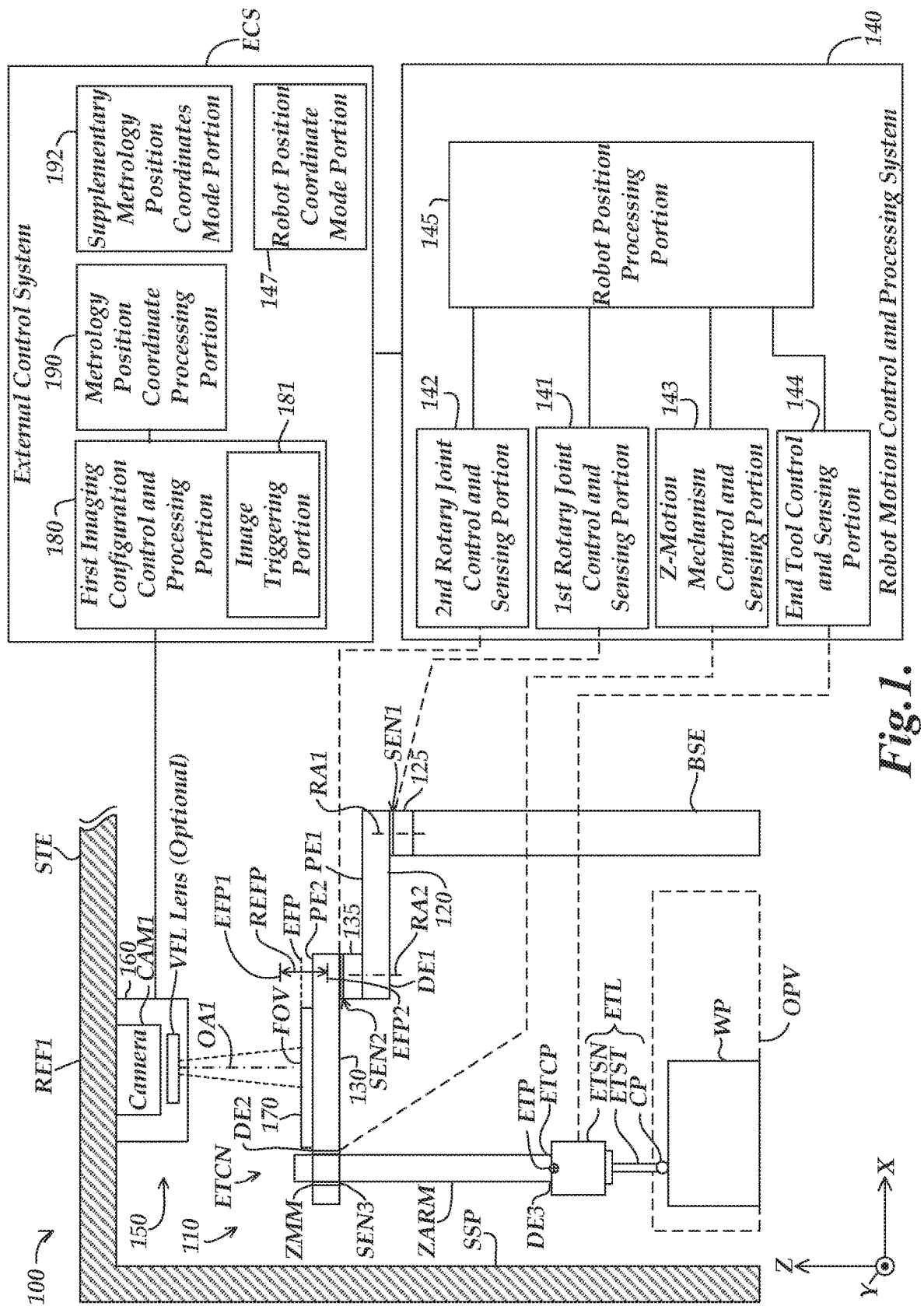
FIG. 1 is a block diagram of a first exemplary implementation of a robot system including an articulated robot and a supplementary metrology position coordinates determination system.

FIG. 1 is a block diagram of a first exemplary implementation of a robot system 100 including an articulated robot 110 and a supplementary metrology position coordinates determination system 150. The articulated robot 110 includes first and second arm portions 120 and 130, first and second rotary joints 125 and 135, position sensors SEN1 and SEN2, an end tool configuration ETCN, and a robot motion control and processing system 140. The first arm portion 120 is mounted to the first rotary joint 125 at a proximal end PE1 of the first arm portion 120. The first rotary joint 125 (e.g., located at an upper end of a supporting base portion BSE) has a rotary axis RA1 aligned along a z axis direction such that the first arm portion 120 moves about the first rotary joint 125 in an x-y plane that is perpendicular to the z axis. The second rotary joint 135 is located at a distal end DE1 of the first arm portion 120. The second rotary joint 135 has its rotary axis RA2 nominally aligned along the z axis direction. The second arm portion 130 is mounted to the second rotary joint 135 at a proximal end PE2 of the second arm portion 130, such that the second arm portion 130 moves about the second rotary joint 135 in an x-y plane that is nominally perpendicular to the z axis. In various implementations, the position sensors SEN1 and SEN2 (e.g., rotary encoders) may be utilized for determining the angular positions (i.e., in the x-y plane) of the first and second arm portions 120 and 130 about the first and second rotary joints 125 and 135, respectively.

In various implementations, the end tool configuration ETCN may include a Z-motion mechanism ZMM, a Z-arm portion ZARM, a position sensor SEN3 and an end tool coupling portion ETCP which couples to an end tool ETL. In various implementations, the end tool ETL may include an end tool sensing portion ETSN and an end tool stylus ETST with a contact point CP (e.g., for contacting a surface of a workpiece WP). The Z-motion mechanism ZMM is located proximate to the distal end DE2 of the second arm portion 130. The Z-motion mechanism ZMM (e.g., a linear actuator) is configured to move the Z-arm portion ZARM up and down in the z axis direction. In some implementations, the Z-arm portion ZARM may also be configured to rotate about an axis parallel to the z axis direction. In any case, the end tool ETL is coupled at the end tool coupling portion ETCP, and has a corresponding end tool position ETP with corresponding coordinates (e.g., x, y and z coordinates). In various implementations, the end tool position ETP may correspond to, or be proximate to, the distal end DE3 of the Z-arm portion ZARM (e.g., at or proximate to the end tool coupling portion ETCP).

The motion control system 140 is configured to control the end tool position ETP of the end tool ETL with a level of accuracy defined as a robot accuracy. More specifically, the motion control system 140 is generally configured to control the x and y coordinates of the end tool position ETP with the robot accuracy based at least in part on sensing and controlling the angular positions (i.e., in the x-y plane) of the first and second arm portions 120 and 130 about the first and second rotary joints 125 and 135, respectively, using the position sensors SEN1 and SEN2. In various implementations, the motion control and processing system 140 may include first and second rotary joint control and sensing portions 141 and 142 that may receive signals from the position sensors SEN1 and SEN2, respectively, for sensing the angular positions of the first and second arm portions 120 and 130, and/or may provide control signals (e.g., to motors, etc.) in the first and second rotary joints 125 and 135 for rotating the first and second arm portions 120 and 130.

In addition, the motion control system 140 is generally configured to control the z coordinate of the end tool position ETP with the robot accuracy based at least in part on sensing and controlling the linear position (i.e., along the z axis) of the Z-arm portion ZARM using the Z-motion mechanism ZMM and the position sensor SEN3. In various implementations, the motion control and processing system 140 may include a Z-motion mechanism control and sensing portion 143 that may receive signals from the position sensor SEN3 for sensing the linear position of the Z-arm portion ZARM, and/or may provide control signals to the Z-motion mechanism ZMM (e.g., a linear actuator) to control the z position of the Z-arm portion ZARM.

The motion control and processing system 140 may also receive signals from the end tool sensing portion ETSN. In various implementations, the end tool sensing portion ETSN may include circuitry and/or configurations related to the operations of the end tool ETL for sensing a workpiece WP. As will be described in more detail below, in various implementations the end tool ETL (e.g., a touch probe, a scanning probe, a camera, etc.) may be utilized for contacting or otherwise sensing surface locations/positions/points on a workpiece WP, for which various corresponding signals may be received, determined and/or processed by the end tool sensing portion ETSN which may provide corresponding signals to the motion control and processing system 140. In various implementations, the motion control and processing system 140 may include an end tool control and sensing portion 144 that may provide control signals to and/or receiving sensing signals from the end tool sensing portion ETSN. In various implementations, the end tool control and sensing portion 144 and the end tool sensing portion ETSN may be merged and/or indistinguishable. In various implementations, the first and second rotary joint control and sensing portions 141 and 142, the Z-motion mechanism control and sensing portion 143, and the end tool control and sensing portion 144 may all provide outputs to and/or receive control signals from a robot position processing portion 145 which may control and/or determine the overall positioning of the articulated robot 110 and corresponding end tool position ETP as part of the robot motion control and processing system 140.

In various implementations, the supplementary metrology position coordinates determination system 150 may be included with or otherwise added to an articulated robot 110 (e.g., as part of a retrofit configuration for being added to an existing articulated robot 110, etc.) In general, the supplementary metrology position coordinates determination system 150 may be utilized to provide an improved level of accuracy for the determination of the end tool position ETP. More specifically, as will be described in more detail below, the supplementary metrology position coordinates determination system 150 may be utilized to determine a relative position that is indicative of the metrology position coordinates of the end tool position ETP, with an accuracy level that is better than the robot accuracy, at least for x and y metrology position coordinates in an x-y plane that is perpendicular to the z axis.

As illustrated in FIG. 1, the supplementary metrology position coordinates determination system 150 includes a first imaging configuration 160, an XY scale 170, an image triggering portion 181, and a metrology position coordinate processing portion 190. The first imaging configuration 160 is coupled to a stationary element STE. In various implementations, the stationary element STE may comprise a frame arranged above at least a portion of an operable work volume OPV of the articulated robot 110, and for which the first imaging configuration 160 is fixed to the frame above a portion of the operable work volume OPV. In various implementations, the stationary element STE may include one or more structural support elements SSP (e.g., extending from a floor, ceiling, etc.) for maintaining the stationary element STE in a fixed location (e.g., with a fixed position and/or orientation) relative to the articulated robot 110.

The first imaging configuration 160 includes a first camera CAM1 and has an optical axis OA1 that is nominally aligned parallel to the z axis. The first imaging configuration 160 has an effective focus range REFP along its optical axis OA1. In various implementations, the range REFP may be bound by first and second effective focus positions EFP1 and EFP2, as will be described in more detail below. At a given time, the first imaging configuration 160 has an effective focus position EFP that falls within the range REFP. In an implementation where a variable focal length (VFL) lens is used, the range REFP may correspond to the range of focus of the VFL lens.

In various implementations, a VFL lens that is utilized may be a tunable acoustic gradient index of refraction (TAG) lens. With respect to the general operations of such a TAG lens, in various implementations a lens controller (e.g., as included in the first imaging configuration control and image processing portion 180) may rapidly adjust or modulate the optical power of the TAG lens periodically, to achieve a high-speed TAG lens capable of a periodic modulation (i.e., at a TAG lens resonant frequency) of 250 kHz, or 70 kHz, or 30 kHz, or the like. In such a configuration, the effective focus position EFP of the first imaging configuration 160 may be (rapidly) moved within the range REFP (e.g., an autofocus search range). The effective focus position EFP1 (or EFPmax) may correspond to a maximum optical power of the TAG lens, and the effective focus position EFP2 (or EFPmin) may correspond to a maximum negative optical power of the TAG lens. In various implementations, the middle of the range REFP may be designated as EFPnom, and may correspond to zero optical power of the TAG lens.

In various implementations, such a VFL lens (e.g., a TAG lens) and a corresponding range REFP may be advantageously chosen such that the configuration limits or eliminates the need for macroscopic mechanical adjustments of the first imaging configuration 160 and/or adjustment of distances between components in order to change the effective focus position EFP. For example, in an implementation where an unknown amount of tilt or "sag" at the distal end DE2 of the second arm portion 130 may occur (e.g., due to the weight and/or specific orientations of the first and second arm portions 120 and 130, etc.), the precise focus distance from the first imaging configuration 160 to the XY scale 170 may be unknown and/or may vary with different orientations of the arms, etc. In such a configuration, it may be desirable for a VFL lens to be utilized that can scan or otherwise adjust the effective focus position EFP to determine and accurately focus at the XY scale 170.

In various implementations, the XY scale 170 comprises a nominally planar substrate SUB arranged nominally perpendicular to the z axis and a plurality of respective imageable features that are distributed on the substrate SUB. The respective imageable features are located at respective known x and y scale coordinates on the XY scale 170. In various implementations, the XY scale 170 may be an incremental or absolute scale, as will be described in more detail below with respect to FIGS. 4 and 5.

In various implementations, the image triggering portion 181 and/or the metrology position coordinate processing portion 190 may be included as part of an external control system ECS (e.g., as part of an external computer, etc.) The image triggering portion 181 may be included as part of a first imaging configuration control and processing portion 180. In various implementations, the image triggering portion 181 is configured to input at least one input signal that is related to the end tool position ETP and to determine the timing of a first imaging trigger signal based on the at least one input signal, and to output the first imaging trigger signal to the first imaging configuration 160. In various implementations, the first imaging configuration 160 is configured to acquire a digital image of the XY scale 170 at an image acquisition time in response to receiving the first imaging trigger signal. In various implementations, the metrology position coordinate processing portion 190 is configured to input the acquired image and to identify at least one respective imageable feature included in the acquired image of the XY scale 170 and the related respective known XY scale coordinate location. In various implementations, the external control system ECS may also include a standard robot position coordinates mode portion 147 and a supplementary metrology position coordinates mode portion 192, for implementing corresponding modes, as will be described in more detail below.

In various implementations, the first imaging configuration 160 may include a component (e.g., a subcircuit, routine, etc.) that activates an image integration of the camera CAM1 periodically (e.g., at a set timing interval) for which the first imaging trigger signal may activate a strobe light timing or other mechanism to effectively freeze motion and correspondingly determine an exposure within the integration period. In such implementations, if no first imaging trigger signal is received during the integration period, a resulting image may be discarded, wherein if a first imaging trigger signal is received during the integration period, the resulting image may be saved and/or otherwise processed/analyzed to determine a relative position, as will be described in more detail below.

In various implementations, different types of end tools ETL may provide different types of outputs that may be utilized with respect to the image triggering portion 181. For example, in an implementation where the end tool ETL is a touch probe that is used for measuring a workpiece and that outputs a touch signal when it touches the workpiece, the image triggering portion 181 may be configured to input that touch signal, or a signal derived therefrom, as the at least one input signal that the timing of a first imaging trigger signal is determined based on. As another example, in an implementation where the end tool ETL is a scanning probe that is used for measuring a workpiece and that provides respective workpiece measurement sample data corresponding to a respective sample timing signal, the image triggering portion 181 may be configured to input that respective sample timing signal, or a signal derived therefrom, as the at least one input signal. As another example, in an implementation where the end tool ETL is a camera that is used to provide a respective workpiece measurement image corresponding to a respective workpiece image acquisition signal, the image triggering portion 181 may be configured to input that workpiece image acquisition signal, or a signal derived therefrom, as the at least one input signal.

In the example implementation of FIG. 1, the supplementary metrology position coordinates determination system 150 is configured with the XY scale 170 coupled to the second arm portion 130 proximate to the distal end DE2 of the second arm portion 130 and the first imaging configuration 160 coupled to a stationary element STE (e.g., a frame arranged above the articulated robot 110) and defining a first reference position REF1. In an alternative implementation (e.g., as will be described in more detail below with respect to FIG. 3), a supplementary metrology position coordinates determination system may be configured with the first imaging configuration 160 coupled to the second arm portion 130 proximate to the distal end DE2 of the second arm portion 130 and the XY scale 170 coupled to a stationary element STE and defining a first reference position REF1.

In either case, as will be described in more detail below, the location of the XY scale 170 along the z axis is within the range of focus of the first imaging configuration 160 (e.g., for which the focus position may be adjusted by a VFL lens or otherwise), and the supplementary metrology position coordinates determination system 150 is configured such that the metrology position coordinate processing portion 190 is operable to determine a relative position (e.g., including x and y coordinates) between the movable one of the XY scale 170 or the first imaging configuration 160 and the first reference position REF1 with an accuracy level that is better than the robot accuracy, based on determining an image position of the identified at least one respective imageable feature in the acquired image. The determined relative position is indicative of the metrology position coordinates of the end tool position ETP at the image acquisition time, with an accuracy level that is better than the robot accuracy, at least for x and y metrology position coordinates in an x-y plane that is perpendicular to the z axis. In various implementations, the supplementary metrology position coordinates determination system 150 may be configured to determine the metrology position coordinates of the end tool position ETP at the image acquisition time, based on the determined relative position and a known coordinate position offset (x and y coordinate offset) between the end tool position ETP and the movable one of the XY scale 170 or the first imaging configuration 160. It will be appreciated that such a system may have certain advantages over various alternative systems. For example, in various implementations a system such as that disclosed herein may be smaller and/or less expensive than alternative systems utilizing technologies such as laser trackers or photogrammetry for tracking robot movement/positions, and may also have higher accuracy in some implementations. The disclosed system also does not take up or obscure any part of the operable work volume OPV, such as alternative systems that may include a scale or fiducial on the ground or stage, or otherwise in the same area (e.g., operable work volume) where workpieces may otherwise be worked on and/or inspected, etc.

Figure 2:
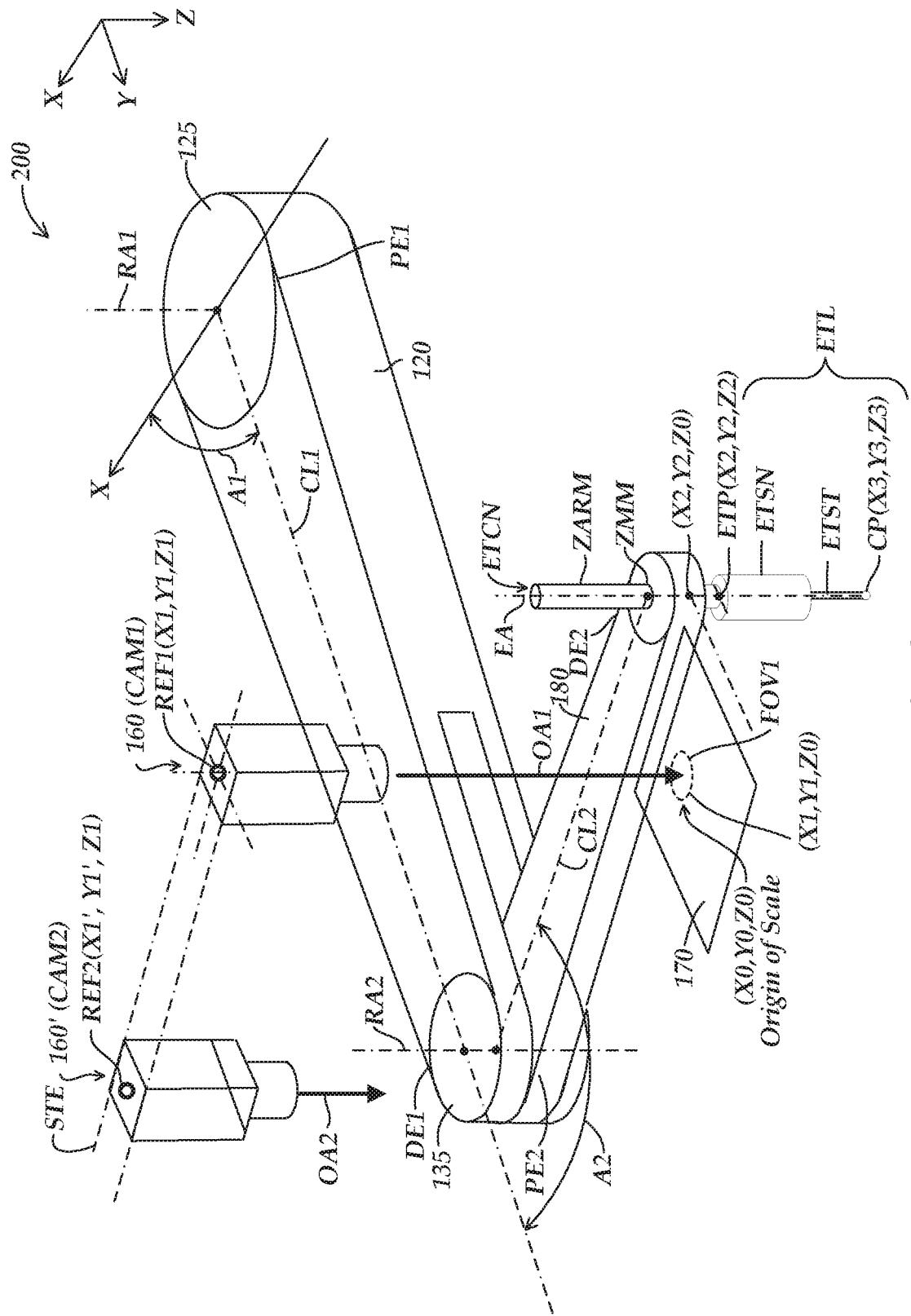
FIG. 2 is an isometric diagram of a second exemplary implementation of a robot system similar to the robot system of FIG. 1, in which a first imaging configuration is coupled to a stationary element.

FIG. 2 is an isometric diagram of a second exemplary implementation of a robot system 200 similar to the robot system 100 of FIG. 1 in which the first imaging configuration 160 is coupled to a stationary element STE (e.g., the stationary element STE of FIG. 1). It will be appreciated that certain numbered components (e.g., 1XX or 2XX) of FIG. 2 may correspond to and/or have similar operations as identically or similarly numbered counterpart components (e.g., 1XX) of FIG. 1, and may be understood to be similar or identical thereto and may otherwise be understood by analogy thereto and as otherwise described below. This numbering scheme to indicate elements having analogous and/or identical design and/or function is also applied to the following FIGS. 3-5.

In the configuration of FIG. 2 (i.e., similar to the configuration of FIG. 1), the XY scale 170 is coupled to the second arm portion 130 proximate to the distal end DE2 of the second arm portion 130. In various implementations, as described above with respect to FIG. 1, the stationary element STE that the first imaging configuration 160 is coupled to may comprise a frame arranged above the articulated robot 110. In various implementations, different reference axes and lines may be designated for referencing certain movements, coordinates and angles of the components of the articulated robot 110. For example, the first and second arm portions 120 and 130 may each have designated horizontal center lines CL1 and CL2, respectively, passing down the centers of the respective arm portions. An angle A1 may be designated as occurring between the center line CL1 of the first arm portion 120 and an x-z plane (e.g., in accordance with an amount of rotation of the first rotary joint 125 about the first rotary axis RA1). An angle A2 may be designated as occurring between the horizontal center line CL1 of the first arm portion 120 and the horizontal center line CL2 of the second arm portion 130 (e.g., in accordance with an amount of rotation of the second rotary joint 135 about the second rotary axis RA2).

In various implementations, the end tool configuration ETCN may be coupled to the second arm portion 130 proximate to the distal end DE2 of the second arm portion 130 and may be designated as having an end tool axis EA of the end tool ETL that nominally intersects the center line CL2 of the second arm portion 130, and for which the end tool axis EA may generally be assumed to be parallel to the rotary axis RA2 and the z axis. In various implementations, the end tool axis EA passes through the end tool position ETP, and has a known coordinate position offset (i.e., for x and y coordinates) from the XY scale 170. Correspondingly, there may be a known coordinate position offset between the end tool position ETP and the XY scale 170. For example, the XY scale 170 may have a designated reference point (e.g., at a center or edge of the XY scale 170) which has a known coordinate position offset (e.g., a known distance) in an x-y plane from the end tool axis EA and correspondingly from the end tool position ETP. In various implementations, such a known coordinate position offset may be expressed in terms of a known x offset and a known y offset.

In various implementations, the known coordinate position offset between the end tool position ETP and the XY scale 170 may be utilized as part of the process for determining the metrology position coordinates of the end tool position ETP. More specifically, as noted above, the supplementary metrology position coordinates determination system 150 may be configured such that the metrology position coordinate processing portion 190 operates to determine a relative position between the XY scale 170 and the first reference position REF1 (i.e., as defined by the stationary first imaging configuration 160), based on determining an image position of the identified at least one respective imageable feature (i.e., of the XY scale 170) in the acquired image. The supplementary metrology position coordinates determination system 150 may further be configured to determine the metrology position coordinates of the end tool position ETP, based on the determined relative position and a known coordinate position offset between the end tool position ETP and the movable XY scale 170. In one specific example implementation, the known coordinate position offset (e.g., expressed in terms of a known x offset and a known y offset) may be added to or otherwise combined with the determined relative position in order to determine the metrology position coordinates of the end tool position ETP.

As one specific example position coordinate configuration, the XY scale 170 may be designated as having a reference position (e.g., an origin location) at X0, Y0, Z0 (e.g., which for an origin location may have values of 0, 0,0). In such a configuration, the reference location REF1 (i.e., as defined by the stationary first imaging configuration 160) may be at relative coordinates of X1, Y1, Z1, and a center of a corresponding field of view FOV1 (e.g., corresponding to an acquired image) may be at relative coordinates of X1, Y1, Z0. A location of the end tool axis EA in an x-y plane extending from the XY scale 170 may be designated as having relative coordinates of X2, Y2, Z0. The end tool position ETP may be designated as having coordinates of X2, Y2, Z2. In various implementations, the end tool ETL may have a contact point CP (e.g., at the end of an end tool stylus ETST for contacting a workpiece) which may be designated as having coordinates X3, Y3, Z3. In an implementation where the contact point CP of the end tool ETL does not vary in the x or y directions relative to the rest of the end tool, the X3 and Y3 coordinates may be equal to the X2 and Y2 coordinates, respectively.

In one specific example implementation, an acquired image may be analyzed by the metrology position coordinate processing portion 190 to determine a relative position (e.g., to determine the X1, Y1 coordinates corresponding to the center of the field of view FOV1 of the stationary first imaging configuration 160). Such a determination may be made in accordance with standard camera/scale image processing techniques (e.g., for determining a location of camera relative to a scale). Various examples of such techniques are described in U.S. Pat. Nos. 6,781,694; 6,937,349; 5,798, 947; 6,222,940; and 6,640,008, each of which is hereby incorporated herein by reference in its entirety. In various implementations, such techniques may be utilized to determine the location of a field of view (e.g., as corresponding to a position of a camera) within a scale range (e.g., within the XY scale 170), as will be described in more detail below with respect to FIGS. 4 and 5. In various implementations, such a determination may include identifying at least one respective imageable feature included in the acquired image of the XY scale 170 and the related respective known XY scale coordinate location. Such a determination may correspond to determining a relative position between the XY scale 170 and the first reference position REF1 (i.e., as defined by the stationary first imaging configuration 160). The relative X2, Y2 coordinates (i.e., of the end tool position ETP) may then be determined according to the known coordinate position offset between the end tool position ETP and the XY scale 170 (e.g., adding the x and y position offset values to X1 and Y1 in order to determine X2 and Y2).

In various implementations, the supplementary metrology position coordinates determination system 150 may further include one or more additional imaging configurations. For example, as illustrated in FIG. 2, the metrology position coordinates determination system 150 may include a second imaging configuration 160' having a second camera CAM2 and an optical axis OA2 that is nominally aligned parallel to the z axis. The second imaging configuration 160' may define a second reference position REF2 (e.g., having relative coordinates of X1', Y1' and Z1). The second imaging configuration 160' may have an effective focus range REFP along its optical axis OA2. In such a configuration, the image triggering portion 181 may be further configured to input at least one input signal that is related to the end tool position ETP and determine the timing of a second imaging trigger signal based on the at least one input signal and output the second imaging trigger signal to the second imaging configuration 160'. In various implementations, the second imaging configuration 160' may be configured to acquire a digital image of the XY scale 170 at an image acquisition time in response to receiving the second imaging trigger signal. The metrology position coordinate processing portion 190 may be further configured to input the acquired image and identify at least one respective imageable feature included in the acquired image of the XY scale 170 and the related respective known XY scale coordinate location.

In various implementations, the metrology position coordinate processing portion 190 may be operable to determine a relative position between the XY scale 170 and the second reference position REF2 with an accuracy level that is better than the robot accuracy, based on determining an image position of the identified at least one respective imageable feature in the acquired image. In such an implementation, the determined relative position is indicative of the metrology position coordinates of the end tool position ETP at the image acquisition time, with an accuracy level that is better than the robot accuracy, at least for x and y metrology position coordinates in an x-y plane that is perpendicular to the z axis.

In various implementations, the at least one input signal that is input to the image triggering portion 181 includes one or more signals derived from the motion control system 140. In such configurations, the image triggering portion 181 may be configured to determine whether the XY scale 170 is aligned with the first or second imaging configuration 160 or 160' based on the one or more signals derived from the motion control system 140. If the XY scale 170 is determined to be aligned with the first imaging configuration 160 (e.g., such that a sufficient portion of the XY scale 170 is imaged by the first imaging configuration 160) the image triggering portion 181 is configured to output the first imaging trigger signal. Conversely, if the XY scale 170 is determined to be aligned with the second imaging configuration 160' (e.g., such that a sufficient portion of the XY scale 170 is imaged by the second imaging configuration 160') the image triggering portion 181 is configured to output the second imaging trigger signal.

Figure 3:
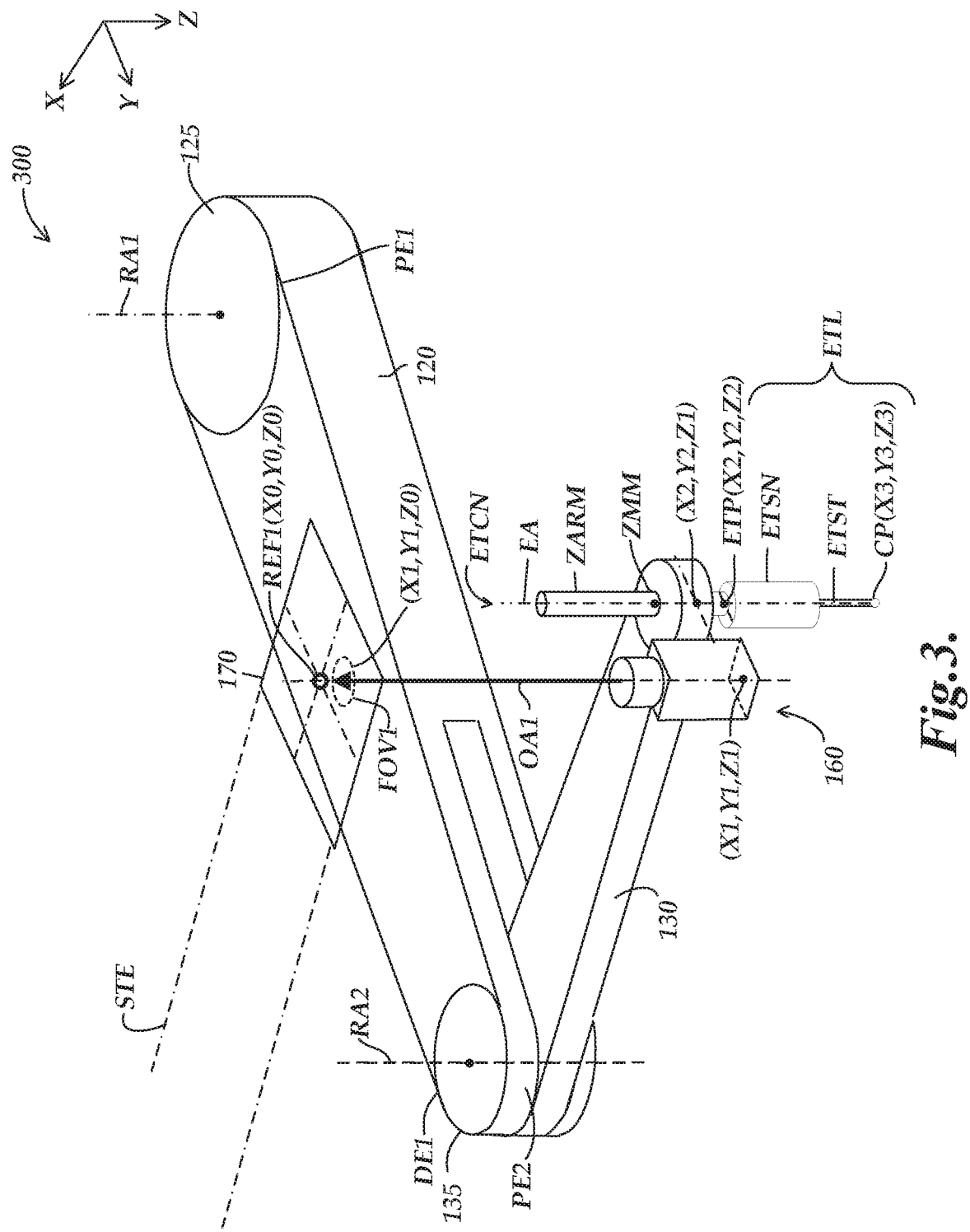
FIG. 3 is an isometric diagram of a third exemplary implementation of a robot system in which an XY scale is coupled to a stationary element.

FIG. 3 is an isometric diagram of a third exemplary implementation of a robot system 300 in which the XY scale 170 is coupled to the stationary element STE and defines the first reference position REF1. In the configuration of FIG. 3, the first imaging configuration 160 is coupled to the second arm portion 130 proximate to the distal end DE2 of the second arm portion 130. In various implementations, the end tool axis EA has a known coordinate position offset (i.e., for x and y coordinates) from the first imaging configuration 160. Correspondingly, there may be a known coordinate position offset between the end tool position ETP and the first imaging configuration 160. For example, the first imaging configuration 160 may have a designated reference point (e.g., at a center of the first imaging configuration 160) which has a known coordinate position offset (e.g., a known distance) in an x-y plane from the end tool axis EA and correspondingly from the end tool position ETP. In various implementations, such a known coordinate position offset may be expressed in terms of a known x offset and a known y offset.

In various implementations, the known coordinate position offset between the end tool position ETP and the first imaging configuration 160 may be utilized as part of the process for determining the metrology position coordinates of the end tool position ETP. More specifically, as noted above, the supplementary metrology position coordinates determination system 150 may be configured such that the metrology position coordinate processing portion 190 operates to determine a relative position between the first imaging configuration 160 and the first reference position REF1 (i.e., as defined by the stationary XY scale 170), based on determining an image position of an identified at least one respective imageable feature (i.e., of the XY scale 170) in the acquired image. The supplementary metrology position coordinates determination system 150 may further be configured to determine the metrology position coordinates of the end tool position ETP, based on the determined relative position and a known coordinate position offset between the end tool position ETP and the movable first imaging configuration 160. In one specific example implementation, the known coordinate position offset (e.g., expressed in terms of a known x offset and a known y offset) may be added to or otherwise combined with the determined relative position in order to determine the metrology position coordinates of the end tool position ETP.

As one specific example position coordinate configuration, the XY scale 170 may be designated as having a reference location REF1 (e.g., an origin location) at X0, Y0, Z0 (e.g., which for an origin location may have values of 0, 0,0). The first imaging configuration 160 may be at a location with relative coordinates of X1, Y1, Z1 and a center of a corresponding field of view FOV1 (e.g., as captured in an acquired image) may be at relative coordinates of X1, Y1, Z0. A location of the end tool axis EA in an x-y plane extending from the first imaging configuration 160 may be designated as having relative coordinates of X2, Y2, Z1. The end tool position ETP may be designated as having coordinates of X2, Y2, Z2. In various implementations, the end tool ETL may have a contact point CP (e.g., at the end of an end tool stylus ETST for contacting a workpiece) which may be designated as having coordinates X3, Y3, Z3. In an implementation where the contact point CP of the end tool ETL does not vary in the x or y directions relative to the rest of the end tool, the X3 and Y3 coordinates may be equal to the X2 and Y2 coordinates, respectively.

In various implementations, the robot system 300 of FIG. 3 may have certain different design considerations and aspects as compared the robot system 200 of FIG. 2 (e.g., related to a possible vertical displacement or sag at the distal ends DE1 and DE2 of the first and second arm portions 120 and 130, respectively). In an implementation where such displacement or sag may occur (e.g., due to the weight and/or different orientations of the arm portions, imaging configuration 160, etc.), a particularly undesirable effect may be experienced in the robot system 300 of FIG. 3 with respect to the field of view FOV of the first imaging configuration 160 being correspondingly shifted. More specifically, such vertical displacement or sag may cause a relatively significant shift/change in the location of the field of view FOV on the XY scale 170 (i.e., as attached to the stationary element STE), which may result in a relatively significant error in the determined relative position and the corresponding metrology position coordinates of the end tool position ETP. Due to such issues, in certain implementations the configuration of the robot system 200 of FIG. 2 may be considered to have corresponding advantages over the robot system 300 of FIG. 3.

Figure 4:
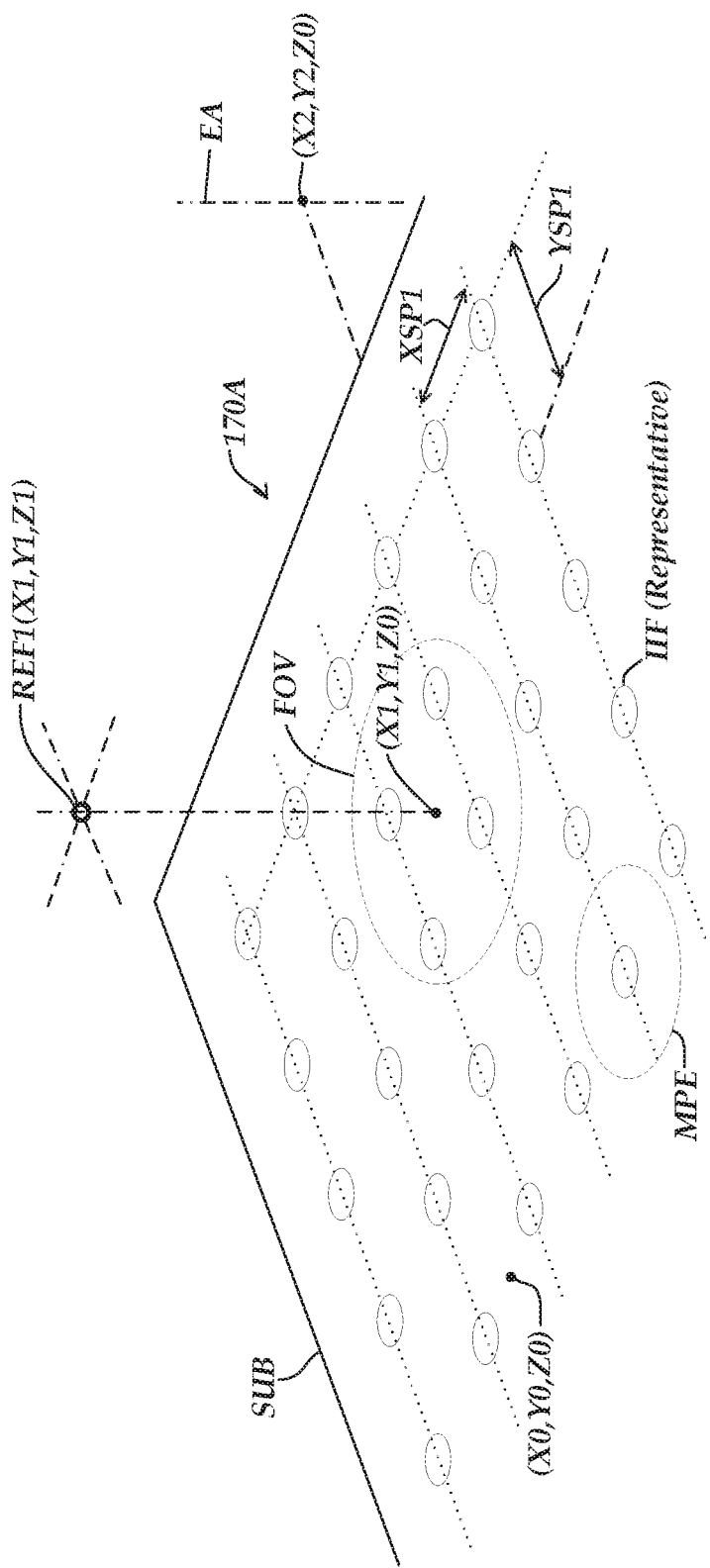
FIG. 4 is an isometric diagram of an exemplary implementation of an incremental XY scale.

FIG. 4 is an isometric diagram of an exemplary implementation of an incremental XY scale 170A. As illustrated in FIG. 4, the incremental XY scale 170A includes an array of evenly spaced incremental imageable features IIF. In various implementations, the incremental XY scale 170A may have a periodicity that is smaller than 100 microns (e.g., for which periodic spacings XSP1 and YSP1 between the incremental imageable features IIF along the respective x and y axes may each be less than 100 microns). In various implementations, the position information that is determined utilizing the incremental XY scale 170A may have an accuracy of at least 10 microns. In contrast to a robot accuracy that may be approximately 100 microns in certain implementations, the accuracy determined utilizing such an XY scale 170A may be at least 10× that of the robot accuracy. In one specific example implementation, the incremental XY scale 170A may have an even higher periodicity of approximately 10 microns, for which, if the magnification of the first imaging configuration 160 is approximately 1× and interpolation is performed by a factor of 10×, an approximately 1 micron accuracy may be achieved. Such a configuration would have an approximately 100× improvement in accuracy over a robot accuracy of approximately 100 microns.

In various implementations, a location of a field of view FOV of the first imaging configuration 160 within the incremental XY scale 170A may provide an indication of a relative position between the XY scale 170A and the first reference position REF1. In various implementations, the first imaging configuration 160 may be utilized in combination with the incremental XY scale 170A as part of a camera/scale image processing configuration. For example, the metrology position coordinate processing portion 190 may determine a relative incremental position between the XY scale 170A and the first reference position REF1 based on the location of the field of view FOV within the incremental XY scale 170A, as indicated by the portion of the XY scale 170A in the acquired image, and as is known in the art for camera/scale image processing techniques (e.g., as described in the previously incorporated references). In various implementations, the incremental XY scale 170A may be of various sizes relative to the field of view FOV (e.g., the incremental XY scale 170A may be at least 4×, 10×, 20×, etc. larger than the field of view FOV).

In various implementations, the incremental position indicated by the XY scale 170A may be combined with position information from the articulated robot 110 to determine a relatively precise and/or absolute position. For example, the sensors SEN1 and SEN2 (e.g., rotary encoders) of the articulated robot 110 may indicate the end tool position ETP with the robot accuracy, for which the incremental position indicated by the XY scale 170A may be utilized to further refine the determined end tool position ETP to have an accuracy that is better than the robot accuracy. In one such configuration, the metrology position coordinate processing portion 190 may be configured to identify one or more respective imageable features IIF included in the acquired image of the XY scale 170A based on the image positions of the one or more imageable features IFF in the acquired image and based on articulated robot position data derived from the motion control system 140 corresponding to the image acquisition time.

In such configurations, the respective imageable features IFF of the XY scale 170A may comprise a set of similar imageable features IFF that are distributed on the substrate such that they are spaced apart from one another at regular intervals by a distance that is more than a maximum position error that is allowed within the robot accuracy. As illustrated in FIG. 4, the imageable features IFF are spaced apart (e.g., at spacings XSP1 and YSP1) by more than a maximum position error MPE as represented by a circle surrounding a representative imageable feature IFF. It will be appreciated that in such a configuration, the robot accuracy for the position determination is sufficient to determine the location with an accuracy that is greater than the spacing between the imageable features IFF. More specifically, in various implementations, a single imageable feature IFF on the XY scale 170A (i.e., wherein the imageable features are all at known x and y metrology position coordinates on the XY scale 170A according to the even spacings across the scale) may thus be identified by the articulated robot position data with sufficient accuracy so that no two imageable features IFF may be confused with one another. In such a configuration, the location of single imageable feature IFF in the acquired image may then be utilized to further refine the end tool position ETP to have an accuracy that is better than the robot accuracy, at least for x and y metrology position coordinates of the end tool position ETP in an x-y plane that is perpendicular to the z axis.

As described above with respect to FIG. 2, in one specific example implementation, the XY scale 170A may be designated as having a reference position (e.g., an origin location) at X0, Y0, Z0 (e.g., which for an origin location may have values of 0, 0,0). In such a configuration, the reference location REF1 (i.e., as defined by the stationary first imaging configuration 160) may be at relative coordinates of X1, Y1, Z1, and a center of a corresponding field of view FOV (e.g., as captured in an acquired image) may be at relative coordinates of X1, Y1, Z0. A location of the end tool axis EA in an x-y plane extending from the XY scale 170 may be designated as having relative coordinates of X2, Y2, Z0. The end tool position ETP may be designated as having coordinates of X2, Y2, Z2.

In operation, an acquired image may be analyzed by the metrology position coordinate processing portion 190 to determine the X1, Y1 coordinates corresponding to the center of the field of view FOV1 of the stationary first imaging configuration 160. In various implementations, such a determination may be made in accordance with standard camera/scale image processing techniques, for determining a location of a field of view (e.g., corresponding to a location of a camera) within a scale range (e.g., within the XY scale 170A). It will be appreciated that in accordance with standard camera/scale image processing techniques, the reference position/origin location X0, Y0, Z0 is not required to be in the field of view FOV for such a determination to be made (i.e., the relative position may be determined from the scale information at any location along the XY scale 170A, as provided in part by the scale elements comprising the evenly spaced incremental imageable features IIF). In various implementations, such a determination may include identifying at least one respective imageable feature included in the acquired image of the XY scale 170 and the related respective known XY scale coordinate location. Such a determination may correspond to determining a relative position between the XY scale 170 and the first reference position REF1 (i.e., as defined by the stationary first imaging configuration 160). The relative X2, Y2 coordinates (i.e., of the end tool position ETP) may then be determined according to the known coordinate position offset between the end tool position ETP and the XY scale 170 (e.g., adding the x and y position offset values to X1 and Y1 in order to determine X2 and Y2).

A specific illustrative example of combining the position information from the articulated robot 110 with the incremental position information indicated by the XY scale 170A to determine a relatively precise and/or absolute position is as follows. As illustrated in FIG. 4, the acquired image may indicate that the center of the field of view FOV is in the middle of four incremental imageable features IIF, but may not indicate which specific four incremental imageable features IIF of the XY scale 170 are included in the image. The position information from the articulated robot 110 may be accurate enough to provide such information, for which the specific four incremental imageable features IIF of the XY scale 170A may be identified (e.g., based in part on the principles noted above by which the imageable features IFF are spaced apart by more than a maximum position error as represented by a representative circular area MPE so that each imageable feature IFF may be uniquely identified). The acquired image may then be analyzed by the metrology position coordinate processing portion 190 to determine precisely where the center of the field of view (i.e., at the coordinates X1, Y1, Z0) occurs within that section of the XY scale (i.e., which includes the specific four incremental imageable features IIF). The process may then continue as indicated above (e.g., for correspondingly determining the X2 and Y2 coordinates of the end tool position ETP).

Figure 5:
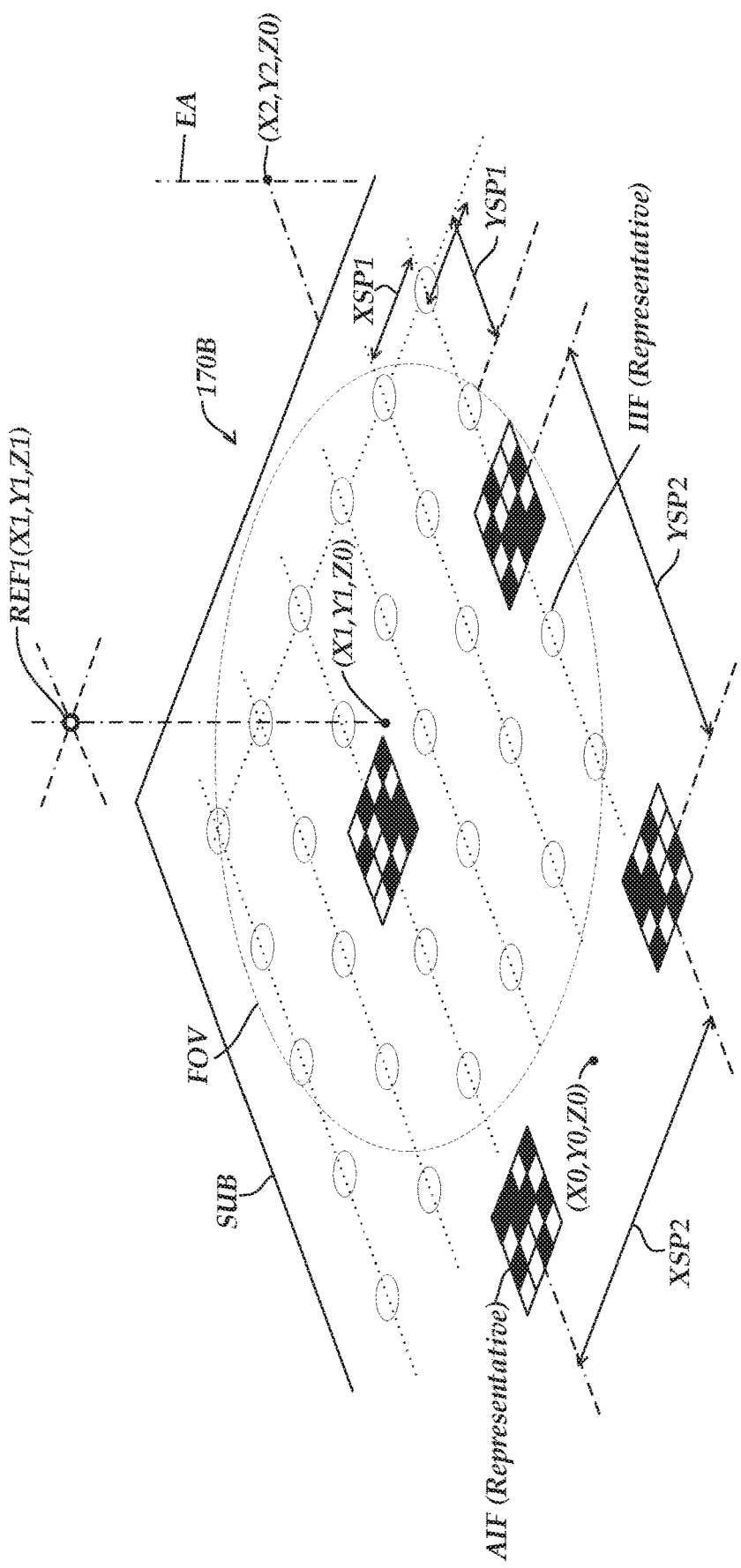
FIG. 5 is an isometric diagram of an exemplary implementation of an absolute XY scale.

FIG. 5 is an isometric diagram of an exemplary implementation of an absolute XY scale 170B. In the example of FIG. 5, similar to the incremental XY scale 170A, the absolute XY scale 170B includes an array of evenly spaced incremental imageable features IIF, and also includes a set of absolute imageable features AIF having unique identifiable patterns (e.g., a 16-bit pattern). In operation, a location of a field of view FOV of the first imaging configuration 160 within the absolute XY scale 170B (i.e., as included in a captured image) provides an indication of an absolute position between the XY scale 170B and the first reference position REF1. In the implementation of FIG. 5, the set of absolute imageable features AIF are distributed on the substrate SUB such that they are spaced apart (e.g., at spacings XSP2 and YSP2) by less than a distance corresponding to a distance across a field of view FOV of the first imaging configuration 160 (i.e., so that at least one absolute imageable feature AIF will always be included in a field of view). In operation, the metrology position coordinate processing portion 190 is configured to identify at least one respective absolute imageable feature AIF included in the acquired image of the XY scale 170B based on the unique identifiable pattern of the respective absolute imageable feature AIF. It will be appreciated that such implementations are able to independently determine an absolute position that is indicative of the end tool position ETP with an accuracy that is better than the robot accuracy, at least for x and y metrology position coordinates of the end tool position ETP in an x-y plane that is perpendicular to the z axis (e.g., and which, in contrast to the incremental XY scale 170B, may not require combining with position information from the articulated robot 110 to determine the absolute position).

A specific illustrative example of utilizing the absolute imageable features AIF to determine a relatively precise and absolute position is as follows. As illustrated in FIG. 5, the acquired image may indicate that the center of the field of view FOV is in the middle of a number of incremental imageable features IIF. The position information from the included two absolute imageable features AIF indicates which section of the XY scale 170B the image includes, for which the included incremental imageable features IIF of the XY scale 170 may also be identified. The acquired image may, accordingly, be analyzed by the metrology position coordinate processing portion 190 to determine precisely where the center of the field of view (i.e., at the coordinates X1, Y1, Z0) occurs within that section of the XY scale (i.e., which includes the two absolute imageable features and the incremental imageable features IIF). The process may then continue as indicated above (e.g., for correspondingly determining the X2 and Y2 coordinates of the end tool position ETP).

Figure 6A:
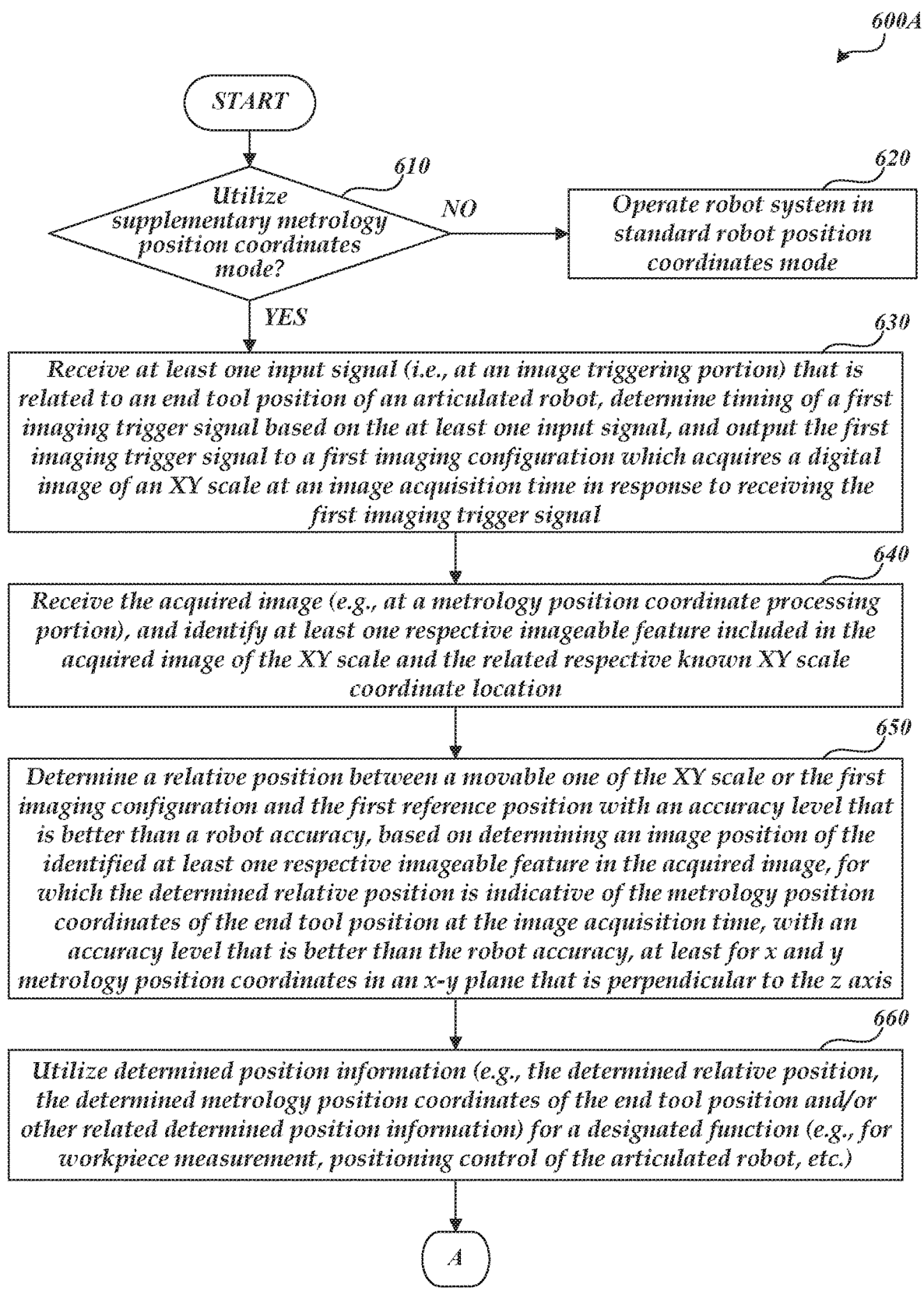

FIGS. 6A and 6B are flow diagrams illustrating exemplary implementations of routines 600A and 600B for operating a robot system including an articulated robot and a supplementary metrology position coordinates determination system. As shown in FIG. 6A, at a decision block 610, a determination is made as to whether the robot system is to be operated in a supplementary metrology position coordinates mode. In various implementations, a selection and/or activation of a supplementary metrology position coordinates mode or a standard robot position coordinates mode may be made by a user and/or may be automatically made by the system in response to certain operations and/or instructions. For example, in one implementation a supplementary metrology position coordinates mode may be entered (e.g., automatically or in accordance with a selection by a user) when the articulated robot moves into a particular position (e.g., moves an end tool from a general area where assembly or other operations are performed to a more specific area where workpiece inspection operations are typically performed and where the supplementary metrology position coordinates mode would be utilized). In various implementations, such modes may be implemented by an external control system ECS (e.g., such as the external control system ECS of FIG. 1 utilizing a standard robot position coordinates mode portion 147 and a supplementary metrology position coordinates mode portion 192). In various implementations, a hybrid mode may be operated either independently or as part of a supplementary metrology position coordinates mode and/or may be implemented as a switching between the modes, as will be described in more detail below with respect to FIG. 7.

If at the decision block 610 it is determined that the robot system is not to be operated in a supplementary metrology position coordinates mode, the routine proceeds to a block 620, where the robot system is operated in a standard robot position coordinates mode. As part of the standard robot position coordinates mode, the position sensors (e.g., rotary encoders) of the articulated robot are utilized to control and determine the articulated robot movements and corresponding end tool position with the robot accuracy (e.g., which is based at least in part on the accuracy of the position sensors of the articulated robot). As noted above, the first and second rotary encoders may indicate the positions of the first and second arm portions with a lower degree of accuracy than the position information that is determined utilizing the XY scale. In general, the robot position coordinates mode may correspond to an independent and/or standard mode of operation for the articulated robot (e.g., a mode in which the articulated robot is operated independently, such as when a supplementary metrology position coordinates determination system is not active or is otherwise not provided).

If the robot system is to be operated in a supplementary metrology position coordinates mode, the routine proceeds to a block 630, where at least one input signal is received (i.e., at an image triggering portion) that is related to an end tool position of an articulated robot. A timing is determined of a first imaging trigger signal based on the at least one input signal and the first imaging trigger signal is output to a first imaging configuration. The first imaging configuration acquires a digital image of an XY scale at an image acquisition time in response to receiving the first imaging trigger signal. At a block 640, the acquired image is received (e.g., at a metrology position coordinate processing portion), and at least one respective imageable feature included in the acquired image of the XY scale and the related respective known XY scale coordinate location are identified.

At a block 650, a relative position between a movable one of the XY scale or the first imaging configuration and the first reference position is determined with an accuracy level that is better than a robot accuracy, based on determining an image position of the identified at least one respective imageable feature in the acquired image. The determined relative position is indicative of the metrology position coordinates of the end tool position at the image acquisition time, with an accuracy level that is better than the robot accuracy, at least for x and y metrology position coordinates in an x-y plane that is perpendicular to the z axis. At a block 660, determined position information (e.g., the determined relative position, the determined metrology position coordinates of the end tool position, and/or other related determined position information) is utilized for a designated function (e.g., for workpiece measurement, positioning control of the articulated robot, etc.) As part of such operations or otherwise, the routine may then proceed to a point A, where in various implementations the routine may end, or may otherwise continue as will be described in more detail below with respect to FIG. 6B.

As indicated in FIG. 6B, the routine 600B may continue from the point A to a block 670. As will be described in more detail below, as part of the routine 600B, the determined position information (e.g., from the block 660) may correspond to or otherwise be utilized for determining a first surface location on a workpiece, and for which a second surface location on the workpiece may then be determined (e.g., as part of a workpiece measurement). At the block 670, at least one second input signal is received (e.g., at the image triggering portion) that is related to the end tool position, and the timing of a second imaging trigger signal is determined based on the at least one second input signal. The second imaging trigger signal is output to the first imaging configuration, wherein the first imaging configuration acquires a second digital image of the XY scale at a second image acquisition time in response to receiving the second imaging trigger signal.

At a block 680, the acquired image is received (e.g., at the metrology position coordinate processing portion), and at least one second respective imageable feature included in the second acquired image of the XY scale and a related respective second known XY scale coordinate location are identified. At a block 690, a second relative position between the movable one of the XY scale or the first imaging configuration and the first reference position is determined with an accuracy level that is better than the robot accuracy, based on determining a second image position of the identified at least one second respective imageable feature in the second acquired image. The determined second relative position is indicative of the metrology position coordinates of the end tool position at the second image acquisition time, with an accuracy level that is better than the robot accuracy, at least for x and y metrology position coordinates in an x-y plane that is perpendicular to the z axis. The second relative position is different from the first relative position, and corresponds to a second surface location on the workpiece that is different from the first surface location.

At a block 695, the first and second relative positions and/or related position information is utilized to determine a dimension of the workpiece that corresponds to a distance between the first and second surface locations on the workpiece that correspond to the respective end tool positions (e.g., as indicating the contact point positions, etc.) at the first and second image acquisition times. It will be appreciated that rather than using the position sensors (e.g., rotary encoders) of the articulated robot to determine the first and second surface locations on the workpiece with the robot accuracy, more accurate position information may be determined utilizing the techniques as described above. More specifically, the determination of the first and second surface locations (i.e., as corresponding to first and second locations on the XY scale for which a precise distance between such locations may be determined utilizing the techniques as described above in accordance with the accuracy of the XY scale) allows the corresponding dimension on the workpiece between the first and second surface locations to be determined with a high degree of accuracy.

Figure 7:
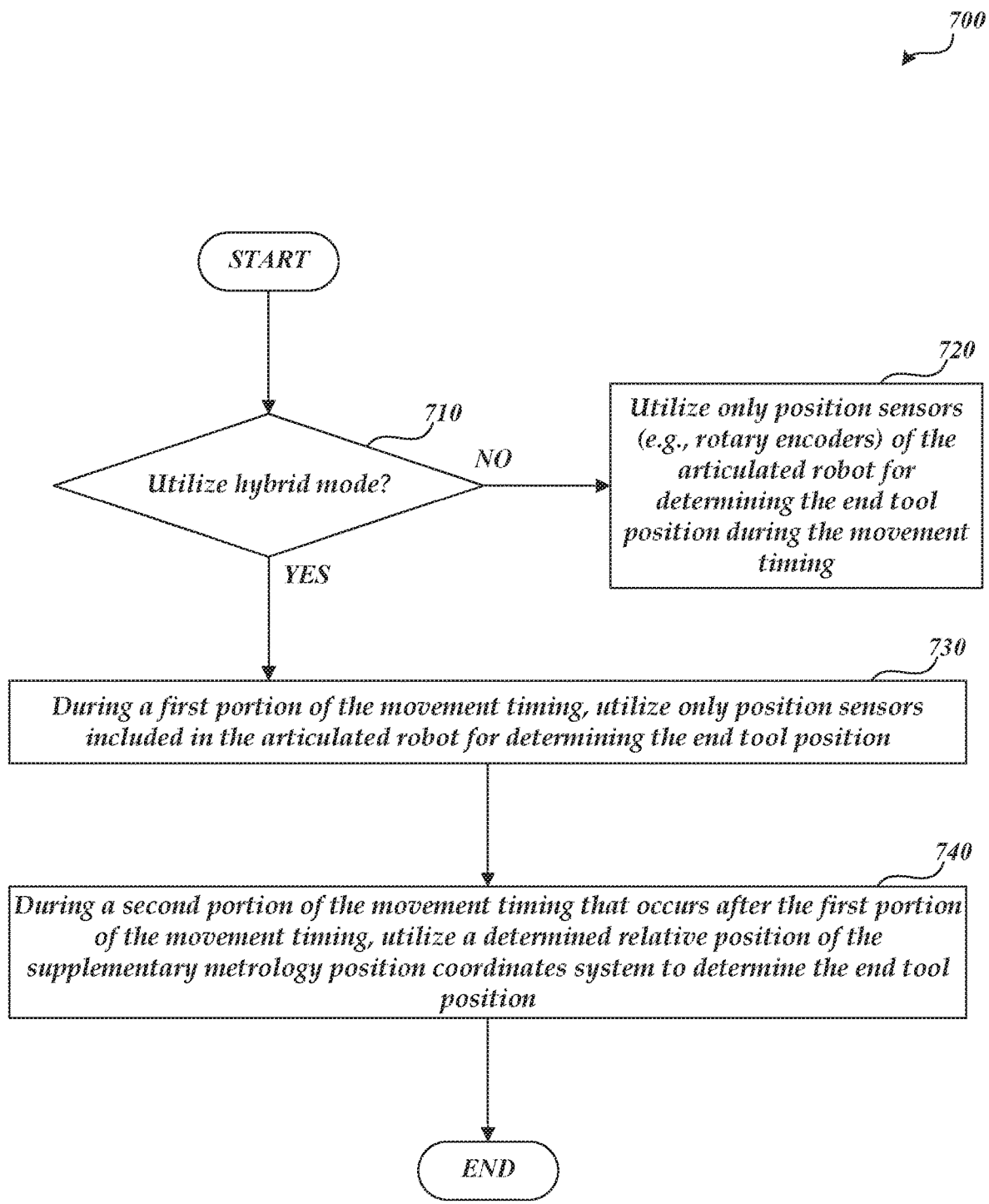
FIG. 7 is a flow diagram illustrating one exemplary implementation of a routine for determining an end tool position in which position sensors may be utilized during a first portion of a movement timing and a determined relative position of a supplementary metrology position coordinates determination system may be utilized during a second portion of a movement timing.

FIG. 7 is a flow diagram illustrating one exemplary implementation of a routine 700 for determining an end tool position in which different techniques may be utilized during different portions of a movement timing. In general, during the movement timing one or more arm portions of the articulated robot are moved from first rotary positions to second rotary positions (e.g., which may include rotating the arm portions around rotary joints from first rotary orientations to a second rotary orientations). As shown in FIG. 7, at a decision block 710, a determination is made as to whether a hybrid mode will be utilized for determining the end tool position during the movement timing. In various implementations, a hybrid mode may also be representative of a process which includes switching between the supplementary metrology position coordinates mode and the standard robot position coordinates mode. If the hybrid mode is not to be utilized, the routine continues to a block 720, where the position sensors (e.g., rotary encoders) of the articulated robot are solely utilized for determining the end tool position during the movement timing.

If the hybrid mode is to be utilized, the routine proceeds to a block 730, for which during a first portion of a movement timing, the position sensors included in the articulated robot are utilized for determining the end tool position. During such operations, a relative position of a supplementary metrology position coordinates determination system may not be determined and/or is otherwise not utilized to determine the end tool position. At a block 740, during a second portion of the movement timing that occurs after the first portion of the movement timing, a determined relative position of the supplementary metrology position coordinates determination system is utilized to determine the end tool position. It will be appreciated that such operations enable the system to perform initial/fast/coarse movement of the end tool position during the first portion of the movement timing, and to perform more accurate final/slower/fine movement of the end tool position during the second portion of the movement timing.

It will be understood that although the element name "XY scale" has been used in this disclosure with reference to the elements 170, 170A, 170S and the like, this element name is exemplary only, and not limiting. It is referred to as an "XY scale" with reference to a Cartesian coordinate system, and its description as comprising a nominally planar substrate arranged nominally perpendicular to the z axis. However, more generally, the element name XY scale should be understood to refer to any reference scale comprising a plurality of features or markings that correspond to known two dimensional coordinates on that reference scale (e.g., accurate and/or accurately calibrated locations in two dimensions), provided that the scale is able to operate as disclosed herein. For example, such scale features may be expressed and/or marked to be in a Cartesian coordinate system on that reference scale, or in a polar coordinate system, or any other convenient coordinate system. Furthermore, such features may comprise features distributed evenly or unevenly throughout an operational scale area, and may comprise graduated or ungraduated scale markings, provided that such features correspond to known two dimensional coordinates on the scale and are able to operate as disclosed herein.

It will be understood that although the robot system disclosed and illustrated herein is generally shown and described with reference to two arm portions (e.g., the first arm portion 120 and the second arm portion 130), it is not so limited. In various implementations, provided that it includes two arm portions such as those described and/or claimed herein, the robot system may include additional arm portions if desired.

It will be understood that the XY scale or reference scale and a camera that is used to image the scale may undergo rotation relative to one another, depending on the motion and/or position of the robot system. It will be appreciated that methods known in the art (e.g., as disclosed in the incorporated references) may be used to accurately determine any such relative rotation and/or perform any required coordinate transformations, and/or analyze the relative position of the camera and the scale according to principles disclosed herein, despite such relative rotations. It will be understood that the metrology position coordinates referred to herein take into account any such relative rotation. Furthermore, it will be understood that in some implementations the metrology position coordinates referred to herein may comprise a set of coordinates that include a precise determination and/or indication of any such relative rotation, if desired.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A robot system, comprising:
   an articulated robot, comprising:
      a first arm portion mounted to a first rotary joint at a proximal end of the first arm portion, the first rotary joint having a rotary axis aligned along a z axis direction such that the first arm portion moves about the first rotary joint in an x-y plane that is perpendicular to the z axis, wherein the first arm portion has a second rotary joint located at a distal end of the first arm portion, the second rotary joint having its rotary axis nominally aligned along the z axis direction;

a second arm portion mounted to the second rotary joint at a proximal end of the second arm portion, such that the second arm portion moves about the second rotary joint in an x-y plane that is nominally perpendicular to the z axis; and a motion control system configured to control an end tool position of an end tool with a level of accuracy defined as a robot accuracy, based at least in part on sensing and controlling the angular positions of the first and second arm portions about the first and second rotary joints, respectively, using position sensors included in the articulated robot; and a supplementary metrology position coordinates determination system, comprising:

a first imaging configuration comprising a first camera, the first imaging configuration having an optical axis that is nominally aligned parallel to the z axis and having a range of focus along its optical axis;

an XY scale comprising a nominally planar substrate arranged nominally perpendicular to the z axis and a plurality of respective imageable features distributed on the substrate, wherein the respective imageable features are located at respective known XY scale coordinates on the XY scale;

an image triggering portion configured to input at least one input signal that is related to the end tool position and determine the timing of a first imaging trigger signal based on the at least one input signal and output the first imaging trigger signal to the first imaging configuration, wherein the first imaging configuration is configured to acquire a digital image of the XY scale at an image acquisition time in response to receiving the first imaging trigger signal, and a metrology position coordinate processing portion configured to input the acquired image and identify at least one respective imageable feature included in the acquired image of the XY scale, and the related respective known XY scale coordinate location, wherein:

the supplementary metrology position coordinates determination system is configured with a movable one of the XY scale or the first imaging configuration coupled to the second arm portion proximate to the distal end of the second arm portion and the other is coupled to a stationary element with the location of the XY scale along the z axis within the range of focus of the first imaging configuration, the stationary one of the XY scale or the first imaging configuration defining a first reference position;

the supplementary metrology position coordinates determination system is configured such that the metrology position coordinate processing portion is operable to determine a relative position between the movable one of the XY scale or the first imaging configuration and the first reference position with an accuracy level that is better than the robot accuracy, based on determining an image position of the identified at least one respective imageable feature in the acquired image; and the determined relative position is indicative of the metrology position coordinates of the end tool position at the image acquisition time, with an accuracy level that is better than the robot accuracy, at least for x and y metrology position coordinates in an x-y plane that is perpendicular to the z axis.

2. The robot system of claim 1, wherein when the end tool is a touch probe that is used for measuring a workpiece and that outputs a touch signal when it touches the workpiece, the image triggering portion is configured to input that touch signal or a signal derived therefrom as its at least one input signal.

3. The robot system of claim 1, wherein when the end tool is a scanning probe that is used for measuring a workpiece and that provides respective workpiece measurement sample data corresponding to a respective sample timing signal, the image triggering portion is configured to input that respective sample timing signal or a signal derived therefrom as its at least one input signal.

4. The robot system of claim 1, wherein when the end tool is a camera that is used to provide a respective workpiece measurement image corresponding to a respective workpiece image acquisition signal, the image triggering portion is configured to input that workpiece image acquisition signal or a signal derived therefrom as its at least one input signal.

5. The robot system of claim 1, wherein the supplementary metrology position coordinates determination system is configured to determine the metrology position coordinates of the end tool position at the image acquisition time, based on the determined relative position and a known coordinate position offset between the end tool position and the movable one of the XY scale or the first imaging configuration.

6. The robot system of claim 1, wherein the XY scale is coupled to the second arm portion proximate to the distal end of the second arm portion and the first imaging configuration is coupled to the stationary element.

7. The robot system of claim 6, wherein the stationary element comprises a frame arranged above at least a portion of an operable work volume of the articulated robot, and the first imaging configuration is fixed to the frame above a portion of the operable work volume of the articulated robot.

8. The robot system of claim 7, wherein:

the supplementary metrology position coordinates determination system further comprises at least a second imaging configuration comprising a second camera, the second imaging configuration having an optical axis that is nominally aligned parallel to the z axis and having a range of focus along its optical axis;

the image triggering portion is further configured to input at least one input signal that is related to the end tool position and determine the timing of a second imaging trigger signal based on the at least one input signal and output the second imaging trigger signal to the second imaging configuration, wherein the second imaging configuration is configured to acquire a digital image of the XY scale at an image acquisition time in response to receiving the second imaging trigger signal, and the metrology position coordinate processing portion is further configured to input the acquired image and identify at least one respective imageable feature included in the acquired image of the XY scale, and the related respective known XY scale coordinate location, wherein:

the supplementary metrology position coordinates determination system is configured with the second imaging configuration defining a second reference position;

the supplementary metrology position coordinates determination system is configured such that the metrology position coordinate processing portion is operable to determine a relative position between the XY scale and the second reference position with an accuracy level that is better than the robot accuracy, based on determining an image position of the identified at least one respective imageable feature in the acquired image; and the determined relative position is indicative of the metrology position coordinates of the end tool position at the image acquisition time, with an accuracy level that is better than the robot accuracy, at least for x and y metrology position coordinates in an x-y plane that is perpendicular to the z axis.

9. The robot system of claim 8, wherein:
the at least one input signal that is input to the image triggering portion includes one or more signals derived from the motion control system; and
the image triggering portion is configured to determine whether the XY scale is aligned with the first or second imaging configuration based on the one or more signals derived from the motion control system; and if the XY scale is aligned with the first imaging configuration the image triggering portion is configured to output the first imaging trigger signal and if the XY scale is aligned with the second imaging configuration the image triggering portion is configured to output the second imaging trigger signal.

10. The robot system of claim 1, wherein:
the respective imageable features of the XY scale comprise a set of imageable features having unique identifiable patterns, wherein that set of imageable features are distributed on the substrate such that they are spaced apart by less than a distance corresponding to a distance across a field of view of the first imaging configuration; and
the metrology position coordinate processing portion is configured to identify at least one respective imageable feature included in the acquired image of the XY scale based on its unique identifiable pattern.

11. The robot system of claim 1, wherein the metrology position coordinate processing portion is configured to identify at least one respective imageable feature included in the acquired image of the XY scale based on its image position in the acquired image and based on articulated robot position data derived from the motion control system corresponding to the image acquisition time.

12. The robot system of claim 11, wherein the respective imageable features of the XY scale comprise a set of similar imageable features that are distributed on the substrate such that they are spaced apart from one another by a distance that is more than a maximum position error that is allowed within the robot accuracy.

13. A method for operating a supplementary metrology position coordinates determination system that is utilized with an articulated robot,
the articulated robot comprising:
a first arm portion mounted to a first rotary joint at a proximal end of the first arm portion, the first rotary joint having a rotary axis aligned along a z axis direction such that the first arm portion moves about the first rotary joint in an x-y plane that is perpendicular to the z axis, wherein the first arm portion has a second rotary joint located at a distal end of the first arm portion, the second rotary joint having its rotary axis nominally aligned along the z axis direction;
a second arm portion mounted to the second rotary joint at a proximal end of the second arm portion, such that the second arm portion moves about the second rotary joint in an x-y plane that is nominally perpendicular to the z axis; and
a motion control system configured to control an end tool position of an end tool with a level of accuracy defined as a robot accuracy, based at least in part on sensing and controlling the angular positions of the first and second arm portions about the first and second rotary joints, respectively, using position sensors included in the articulated robot;

the supplementary metrology position coordinates determination system comprising:
a first imaging configuration comprising a first camera, the first imaging configuration having an optical axis that is nominally aligned parallel to the z axis and having a range of focus along its optical axis;
an XY scale comprising a nominally planar substrate arranged nominally perpendicular to the z axis and a plurality of respective imageable features distributed on the substrate, wherein the respective imageable features are located at respective known XY scale coordinates on the XY scale;
an image triggering portion; and
a metrology position coordinate processing portion,
wherein the supplementary metrology position coordinates determination system is configured with a movable one of the XY scale or the first imaging configuration coupled to the second arm portion proximate to the distal end of the second arm portion and the other is coupled to a stationary element with the location of the XY scale along the z axis within the range of focus of the first imaging configuration, the stationary one of the XY scale or the first imaging configuration defining a first reference position:

the method comprising:
receiving at the image triggering portion at least one input signal that is related to the end tool position and determining the timing of a first imaging trigger signal based on the at least one input signal and outputting the first imaging trigger signal to the first imaging configuration, wherein the first imaging configuration acquires a digital image of the XY scale at an image acquisition time in response to receiving the first imaging trigger signal;
receiving at the metrology position coordinate processing portion the acquired image and identifying at least one respective imageable feature included in the acquired image of the XY scale, and the related respective known XY scale coordinate location; and
determining a relative position between the movable one of the XY scale or the first imaging configuration and the first reference position with an accuracy level that is better than the robot accuracy, based on determining an image position of the identified at least one respective imageable feature in the acquired image, wherein the determined relative position is indicative of the metrology position coordinates of the end tool position at the image acquisition time, with an accuracy level that is better than the robot accuracy, at least for x and y metrology position coordinates in an x-y plane that is perpendicular to the z axis.

14. The method of claim 13, wherein the method is performed during a supplementary metrology position coordinates mode.

15. The method of claim 13, further comprising utilizing the determined relative position for measuring a workpiece.

16. The method of claim 15, wherein the determined relative position is a first determined relative position which corresponds to a first surface location on the workpiece, and the method further comprises:
receiving at the image triggering portion at least one second input signal that is related to the end tool position and determining the timing of a second imaging trigger signal based on the at least one second input signal and outputting the second imaging trigger signal to the first imaging configuration, wherein the first imaging configuration acquires a second digital image of the XY scale at a second image acquisition time in response to receiving the second imaging trigger signal;
receiving at the metrology position coordinate processing portion the acquired image and identifying at least one second respective imageable feature included in the second acquired image of the XY scale, and a related respective second known XY scale coordinate location;
determining a second relative position between the movable one of the XY scale or the first imaging configuration and the first reference position with an accuracy level that is better than the robot accuracy, based on determining a second image position of the identified at least one second respective imageable feature in the second acquired image, wherein the determined second relative position is indicative of the metrology position coordinates of the end tool position at the second image acquisition time, with an accuracy level that is better than the robot accuracy, at least for x and y metrology position coordinates in an x-y plane that is perpendicular to the z axis, and the second relative position is different than the first relative position and corresponds to a second surface location on the workpiece that is different than the first surface location; and
utilizing the first and second relative positions to determine a dimension of the workpiece that corresponds to a distance between the first and second surface locations on the workpiece.

17. The method of claim 13, further comprising utilizing the determined relative position to determine the position of the second arm portion during rotary movement of the second arm portion about the second rotary joint.

18. The method of claim 17, wherein:
during a movement timing, the second arm portion is rotated around the second rotary joint from a first rotary orientation to a second rotary orientation;
during a first portion of the movement timing, at least one of the position sensors included in the articulated robot is utilized for determining the position of the second arm portion, and the determined relative position is not utilized to determine the position of the second arm portion; and
during a second portion of the movement timing that occurs after the first portion of the movement timing, the determined relative position is utilized to determine the position of the second arm portion.

19. The method of claim 13, wherein the end tool is a touch probe that is used for measuring a workpiece and that outputs a touch signal when it touches the workpiece, and the at least one input signal is the touch signal or a signal derived therefrom.

20. The method of claim 13, wherein the end tool is a scanning probe that is used for measuring a workpiece and that provides respective workpiece measurement sample data corresponding to a respective sample timing signal, and the at least one input signal is the respective sample timing signal or a signal derived therefrom.

21. The method of claim 13, wherein the end tool is a camera that is used to provide a respective workpiece measurement image corresponding to a respective workpiece image acquisition signal, and the at least one input signal is the workpiece image acquisition signal or a signal derived therefrom.

22. A supplementary metrology position coordinates determination system for use with an articulated robot, the supplementary metrology position coordinates determination system comprising:
a first imaging configuration comprising a first camera, the first imaging configuration having an optical axis that is nominally aligned parallel to a z axis and having a range of focus along its optical axis;
an XY scale comprising a nominally planar substrate arranged nominally perpendicular to the z axis and a plurality of respective imageable features distributed on the substrate, wherein the respective imageable features are located at respective known XY scale coordinates on the XY scale;
an image triggering portion configured to input at least one input signal that is related to an end tool position of an articulated robot and determine the timing of a first imaging trigger signal based on the at least one input signal and output the first imaging trigger signal to the first imaging configuration, the articulated robot including a first arm portion mounted to a first rotary joint at a proximal end of the first arm portion and having a second rotary joint located at a distal end of the first arm portion, a second arm portion mounted to the second rotary joint at a proximal end of the second arm portion and a motion control system configured to control an end tool position of an end tool with a level of accuracy defined as a robot accuracy, based at least in part on sensing and controlling the angular positions of the first and second arm portions about the first and second rotary joints, respectively, using position sensors included in the articulated robot, wherein the first imaging configuration is configured to acquire a digital image of the XY scale at an image acquisition time in response to receiving the first imaging trigger signal, and
a metrology position coordinate processing portion configured to input the acquired image and identify at least one respective imageable feature included in the acquired image of the XY scale, and the related respective known XY scale coordinate location,
wherein:
the supplementary metrology position coordinates determination system is configured with a movable one of the XY scale or the first imaging configuration coupled to the second arm portion proximate to the distal end of the second arm portion and the other is coupled to a stationary element with the location of the XY scale along the z axis within the range of focus of the first imaging configuration, the stationary one of the XY scale or the first imaging configuration defining a first reference position;

the supplementary metrology position coordinates determination system is configured such that the metrology position coordinate processing portion is operable to determine a relative position between the movable one of the XY scale or the first imaging configuration and the first reference position with an accuracy level that is better than the robot accuracy, based on determining an image position of the identified at least one respective imageable feature in the acquired image; and the determined relative position is indicative of the metrology position coordinates of the end tool position at the image acquisition time, with an accuracy level that is better than the robot accuracy, at least for x and y metrology position coordinates in an x-y plane that is perpendicular to the z axis.

23. The supplementary metrology position coordinates determination system of claim 22, wherein the XY scale is coupled to the second arm portion proximate to the distal end of the second arm portion and the first imaging configuration is coupled to the stationary element.

* * * * *